No. 728,577. PATENTED MAY 19, 1903.
J. HOTSAPILLAR.
SCALE.
APPLICATION FILED APR. 14, 1892.

NO MODEL. 2 SHEETS—SHEET 1.

No. 728,577. PATENTED MAY 19, 1903.
J. HOTSAPILLAR.
SCALE.
APPLICATION FILED APR. 14, 1892.
NO MODEL. 2 SHEETS—SHEET 2.
Fig. III.
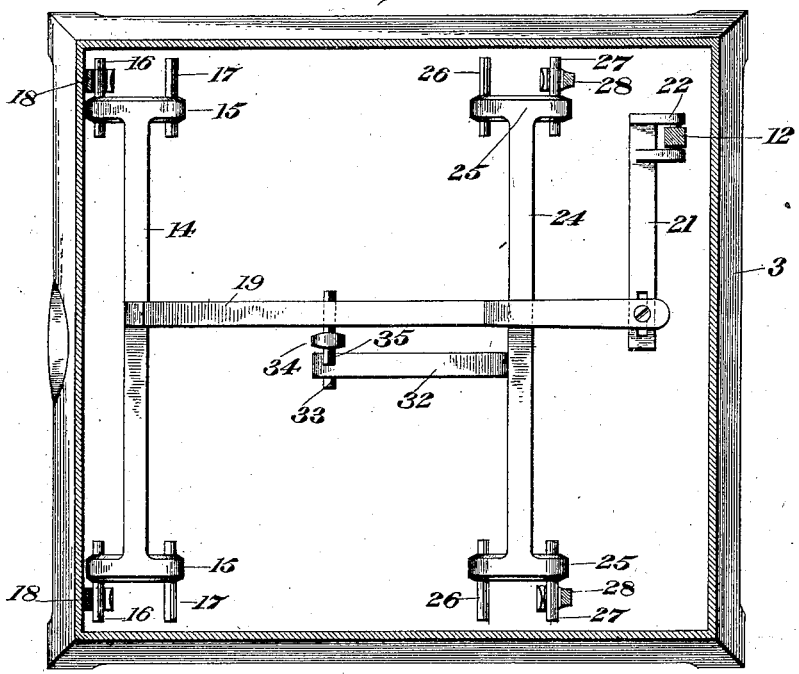
Fig. IV.
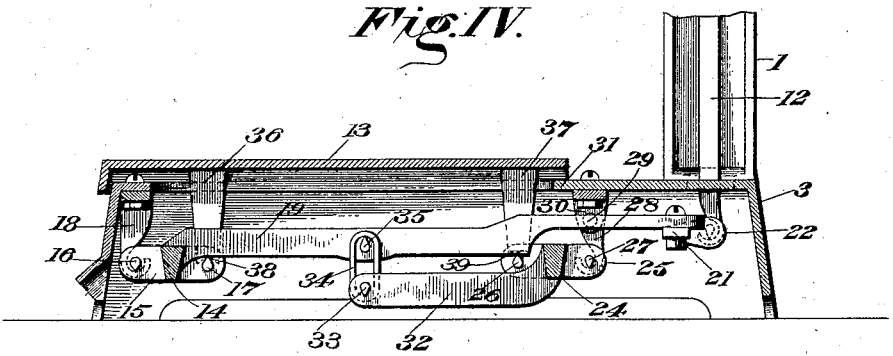
Witnesses
M. E. Fowler
R. H. Young
Jacob Hotsapillar
Inventor
By Joseph L. Atkins
Attorney No 728,577.

Patented May 19, 1903.

UNITED STATES PATENT OFFICE.

JACOB HOTSAPILLAR, OF DAYTON, OHIO, ASSIGNOR TO THE COMPUTING SCALE COMPANY, OF DAYTON, OHIO, A CORPORATION OF OHIO.

SCALE.

SPECIFICATION forming part of Letters Patent No. 728,577, dated May 19, 1903.

Application filed April 14, 1892. Serial No. 429,165. (No model.)

*To all whom it may concern:*

Be it known that I, JACOB HOTSAPILLAR, a citizen of the United States, residing at Dayton, in the county of Montgomery and State of Ohio, have invented certain new and useful Improvements in Scales; and I do hereby declare the following to be a full, clear, and exact description of the invention, such as will enable others skilled in the art to which it appertains to make and use the same.

This invention relates to improvements in weighing and price scales, or scales which will indicate the cost of goods at different rates per unit of weight; and the invention has for its object to materially simplify the mechanical features of the scale and to produce a scale in which while great accuracy is secured no difficult or complicated manipulation will be necessary in the practical handling of the scale.

The invention consists in certain novel details of construction and combinations and arrangements of parts, all as will be now described, and pointed out particularly in the appended claims.

Referring to the accompanying drawings, Figure 1 is a rear elevation, with the base broken away, of a scale embodying my present invention. Fig. 2 is a section on the line 2 2, Fig. 1. Fig. 2ª is a section on the line $a\,a$, Fig. 1. Fig. 3 is a section on the line 3 3, Fig. 1. Fig. 4 is a section on the line 4 4, Fig. 1.

Like numerals refer to the same parts in all the drawings.

The base 3 of the scale illustrated in the accompanying drawings constitutes a housing from which uprights 1 spring and carry at their upper ends a cap 2, these parts being of any preferred or usual construction in the class of platform-scales, although I do not wish to be limited to the use of the invention in this particular class of scales. Within the base-housing 3 and supported on corner-loops 18 and 28 are the platform or weight supporting levers 14 19 and 24 32, these levers being of any usual construction, but preferably with double knife-edge bearings 16 17 and 26 27 and connected by a central equalizing-loop and pivots 33 34 35. All of these parts, it will be understood, may be of any usual and well-known construction, and, as is usual in scales of this class, one of the levers is provided with a pivot or bearing, as at 22, for the attachment of the vertical connection extending up to the beam or parts above the base.

The framework above the base, formed in this instance by the standards and cap, is adapted to support the beams, two of which are employed, one for indicating value and the other a tare-beam or weighing-beam. In order to support the beams, the frame is provided with a tare or weighing beam yoke 7, having bearings for the reception of knife-edge pivots 5 of a tare or weighing beam 4 and with a value-beam stand 45, having bearings for the reception of knife-edge pivots 46 of a value-beam 48.

The value-beam is preferably made throughout a portion at least of its length with two bars, one above the other, as is common in this art, the upper bar 46 constituting the value-beam proper and the lower bar 49 the price-beam, the two being rigidly connected and graduated the one to indicate total value and the other to indicate unit values or rates per unit. The particular marking on the beams is not material in so far as the range of marking is concerned; but of course the markings or graduations on all the beams should in each scale bear a definite relation to each other, as is well understood, in order to secure uniformity of action under all conditions.

In order now to operatively connect the platform-levers or parts for receiving the goods to be weighed with the beams, and at the same time avoid all complication and insure accuracy of results, I provide an upwardly-extending connecting-piece or connector which supports directly or has formed upon it a horizontal guide-bar, which guide-bar moves bodily up and down in unison with the levers, while maintaining its parallelism with the horizon. Thus a connection may be established between it and the price or rate bar of the value-beam by means of a connecting piece or block adapted to move to any point along the guide-bar without affecting or varying the balance of the scales.

In the preferred construction a vertical bar or connector 12 is provided, on the upper end of which is directly mounted and supported the horizontal guide formed by two bars 40 and 44, which bars, taken together, constitute a horizontal guide having a central slot, through which slot a pin or bottom piece 58 of the connecting-block 56 passes. The block 56 is supported on the guide-bar and is balanced up therewith, but is adapted to form the connection between the bar and the value-beam, for which purpose it preferably has its upper end provided with an engaging portion which will take over the price-bar of the value-beam to cause said beam to oscillate in unison with the bodily up-and-down movements of the guide-bar.

The tare or weighing beam is pivotally connected with the vertical connector by means of bearings at 11, which as the weighing-beam is below the value-beam are located intermediate the horizontal guide-bar and the platform-levers, and in this preferred construction the vertical connector is deflected or bent away from the pivots of the weighing-beam. Thus while the vertical connector may be brought in close to the beam-pivots these latter pivots and the pivotal connection between the beam and vertical connector will be somewhat widely separated.

The weighing or tare beam serves as a convenient means for balancing up or counterbalancing the platform-levers, the vertical connector, horizontal guide-bar, and connecting-block, which parts, it will be understood, are put in perfect balance independent of the value-beam, and the latter is, as is usual in this class of scales, put in independent balance.

The beams are provided with sliding poises 8 and 51, which register with graduations indicating pounds and ounces and value, respectively, and in addition the beams have the usual pendants 9 and 52 at the outer ends.

An indicating-needle 53 is provided on the rear end of the value-beam, working in a beam-stop formed by the slotted head 54 on the bracket 55 and serves not only to indicate the balance, but also to limit the oscillation of the beams to the very small arc of movement necessary for them to have in the efficient working of the scale.

A platform or goods-receiver 13 is supported on the platform-levers by means of legs 36 37 or other usual provision made for receiving the goods.

In use the weight of the goods or tare may be ascertained by the use of the tare or weighing beam regardless of the position of the connecting-block, and when it is desired to indicate value the said connecting-block is shifted to register with the desired rate indication and by the use of the value-beam and poise 51 the scale put in balance, when the total value will be indicated by the graduation with which the poise registers. This pricing operation is of course reversed when an unknown quantity is to be given for a fixed sum. In other words, the scale is then first set and then the goods added to secure a balance.

Although I have in some respects specifically described the construction and relative arrangement of the several elements of my improved scale, yet I do not desire to be confined to the same, as such changes and modifications may be made as fairly fall within the scope of my invention.

What I claim as new is—

1. In a scale, the combination with the platform, the weight-supporting levers and the weighing-beam provided with graduations indicating pounds and ounces, and with a poise, and connected with said levers, of a value-beam, a guide-bar, a part rigid therewith and directly connected with the weight-supporting levers, said bar arranged to vibrate bodily in horizontal parallelism throughout a range of movement corresponding to the range of movement of the point of connection with the platform-levers, and a connection between the value-beam and said bar adapted to move longitudinally on the latter; substantially as set forth.

2. In a scale, the combination with the platform, the weight-supporting levers and weight-beam provided with graduations indicating pounds and ounces and with a poise and connected with said levers, of a value-beam, a guide-bar, a part rigid therewith and directly connected with the weight-supporting levers, said bar vibrating bodily in horizontal parallelism throughout a range of movement corresponding to the range of movement of the point of connection with the platform-levers, a block fitted on said bar to move longitudinally thereof and connections between said block and the value-beam; substantially as set forth.

3. In a price-scale, the combination with the platform, or goods-receiver, the weight-supporting mechanism including a lever, a horizontal guide, a vertical connection connected directly to and supporting said horizontal guide and connecting the same with the weight-supporting mechanism, and a beam for balancing up said platform, weight-supporting mechanism and lever, vertical connection and horizontal guide, of a pivoted price-beam balanced within itself and a connection between the price-beam and guide movable longitudinally of the latter; substantially as set forth.

4. In a price-scale, the combination with the platform, the weight-carrying levers below the platform, the price-beam above the platform, the horizontal guide, laterally-adjustable connecting device or draft-transmitter engaging with the price-beam and supported on the guide, means for movably supporting the guide in position and the knife-edge or pivot secured to one of the weight-supporting levers and receiving directly the thrust or draft of the horizontal guide and permitting the guide to vibrate relatively to the weight-supporting levers while connected therewith; substantially as set forth.

5. In a scale, the combination with the base, the weight-supporting levers fulcrumed within the base, the platform supported on said levers, the weight-beam provided with graduations indicating pounds and ounces and a poise, supported above the platform, and the longitudinally-stationary value-beam, of the vertical connector pivotally connected directly to the weight-supporting levers and directly rising and falling therewith throughout the same range of movement, a guide-bar mounted on the upper end of said vertical connector, pivotal connections between the vertical connector and weight-beam and means connecting the value-beam with and adapted to move longitudinally of the guide-bar, substantially as set forth, whereby the weight-supporting levers are directly connected to the value-beam; substantially as described.

6. In a scale, the combination with the base, the weight-supporting levers fulcrumed within the base, the platform supported on said levers, the weight-beam provided with graduations indicating pounds and ounces and a poise, supported above the platform and the longitudinally-stationary value-beam, of the guide-bar having the integral depending arm or connector pivotally connected to the weight-supporting lever and directly receiving the draft thereof, a pivotal connection between said vertical connection and weight-beam and means connecting the value-beam with and adapted to move longitudinally of the guide-bar; substantially as set forth.

7. In a scale, the combination with a platform or load-support, the weight-carrying mechanism including a lever, the value-beam, the guide-bar, the connecting-block or draft-transmitter between the guide-bar and value-beam, means for connecting the guide-bar directly to the rising and falling end of the said lever, a weight-beam provided with graduations indicating pounds and ounces and a poise, connected to the guide-bar and the lever by a pivotal connection, means for balancing the weighing-beam and also counterbalancing the draft-transmitter, the guide-bar, the platform and the weight-carrying mechanism and lever, the draft-transmitter being thus counterbalanced uniformly in any of its positions along the value-beam; substantially as set forth.

8. In a price-scale, the combination with a weight or goods receiver, a supporting-lever mechanism therefor, a vertical connector having a horizontal guide-bar rigidly mounted upon and supported by the upper end of the connector and a weighing or tare beam for counterbalancing the goods-receiver, vertical connector and horizontal guide-bar, of a value-beam mounted in fixed bearings and having a rate-bar and a value-bar and a connector interposed between the horizontal guide-bar and rate-bar of the value-beam and adapted to be adjusted horizontally thereon to vary the effective leverage exerted by the value-beam; substantially as described.

9. In a price-scale, the combination with the weight or goods receiver, the levers for supporting the same, the weighing-beam and the value-beam, of a vertical connector interposed between one of the weight or goods receiver supporting levers and the value-beam, the intermediate portion of said connector being recessed, a pivotal connection between said vertical connector and weight-beam located in said recess; a horizontal guide on said connector, and a movable connection between said guide and value beam; substantially as described.

10. In a price-scale, the combination with the goods-receiver or platform, platform-levers, value-beam and weighing-beam located intermediate the value-beam and platform-levers, of a vertical connection extending upwardly from the platform-levers with pivotal connections between said vertical connection and weighing-beam and a horizontal guide-bar on said vertical connection extending over and in substantially the same vertical plane as the weight-beam, and a connecting-block interposed between said guide-bar and value-beam; substantially as described.

11. In a computing-scale, a price-beam, a platform-lever, a frame, direct pivotal connection between the frame and the platform-lever, sliding connection through a movable member between the frame and the price-beam, and a counterweight mounted in the framework of the scale and pivotally connected with said frame above the platform-lever.

12. In a price-scale, the combination of a price-beam, a knife-edged rate-pivot adjustable with reference to said beam, a slotted guide mounted parallel with said beam and connected to a support for the article to be weighed, a connection between said knife-edged pivot and said guide, a member on said connection and engaging in the slot formed in said guide, a lever connected to said guide and a poise upon said lever.

13. In a computing-scale, the combination of the price-beam, the platform-levers, the tare-beam, the connecting-frame operatively connected directly with the levers, rising from one side of the base and having an elongated upper edge extending over the tare-beam, and the connecting-block adapted to connect with the said upper edge of the frame at any point throughout its length, and to connect said frame with said price-beam.

14. The combination of the platform-lever, the connecting-frame pivoted directly on said platform-lever, said frame mounted to move independently of the fixed framework, the price-beam, the latterally-movable connecting-block connecting the frame and price-beam, and means for balancing said connecting-frame with the platform-levers independently of the computing-beam, the said balancing means adapted to hold the frame upright.

15. In a computing-scale, a price-beam fixed against longitudinal movement, a platform-lever, a connecting-frame having a slidable element mounted upon it and arranged to connect it with said beam at one end, suitable connections between said lever and said frame at the other end of said frame and a tare-beam suitably mounted in the framework of the scale and connected to said platform-lever through said frame; substantially as set forth.

16. In a computing-scale, a price-beam fixed against longitudinal movement, a platform-lever, a frame pivotally connected with said platform-lever, a slidable connecting member between said frame and said price-beam, a tare-beam suitably mounted in the framework of the scale, and pivotal connection between said tare-beam and said frame; substantially as set forth.

17. In a computing-scale, a price-beam fixed against longitudinal movement, a platform-lever, a frame pivotally connected with said platform-lever, a slidable connective member between said frame and said price-beam, a tare-beam suitably mounted in the framework of the scale, a pivotal connection between said tare-beam and said frame, said tare-beam being arranged to lift said connective member free from said price-beam, substantially as set forth.

18. In a computing-scale, a price-beam fixed against longitudinal movement, a platform-lever, a frame pivotally connected with said platform-lever, a slidable connective member between said frame and said price-beam, and a suitable mechanism for lifting the said frame whereby the connective member may be freely moved along said beam, substantially as set forth.

19. In a computing-scale, the combination of the platform-levers, the connecting-frame, the tare-beam directly connected with said connecting-frame, the computing-beam, a laterally-movable connecting-block between the frame and the computing-beam, said connecting-frame and connecting-block balanced independent of the computing-beam; substantially as described.

20. The combination of a price-beam, the platform-lever, the connecting-frame provided with an elongated upper edge and directly pivoted at its lower end to the said platform-lever, the tare-beam mounted in the same plane as the connecting-frame and operatively connected therewith and the movable conecting-block adapted to engage with the elongated upper edge of the connecting-frame throughout its length and with the price-beam; substantially as described.

In testimony whereof I affix my signature in presence of two witnesses.

JACOB HOTSAPILLAR.

Witnesses:
EDWARD T. HALL,
M. J. SWADENER.